Figure 1:
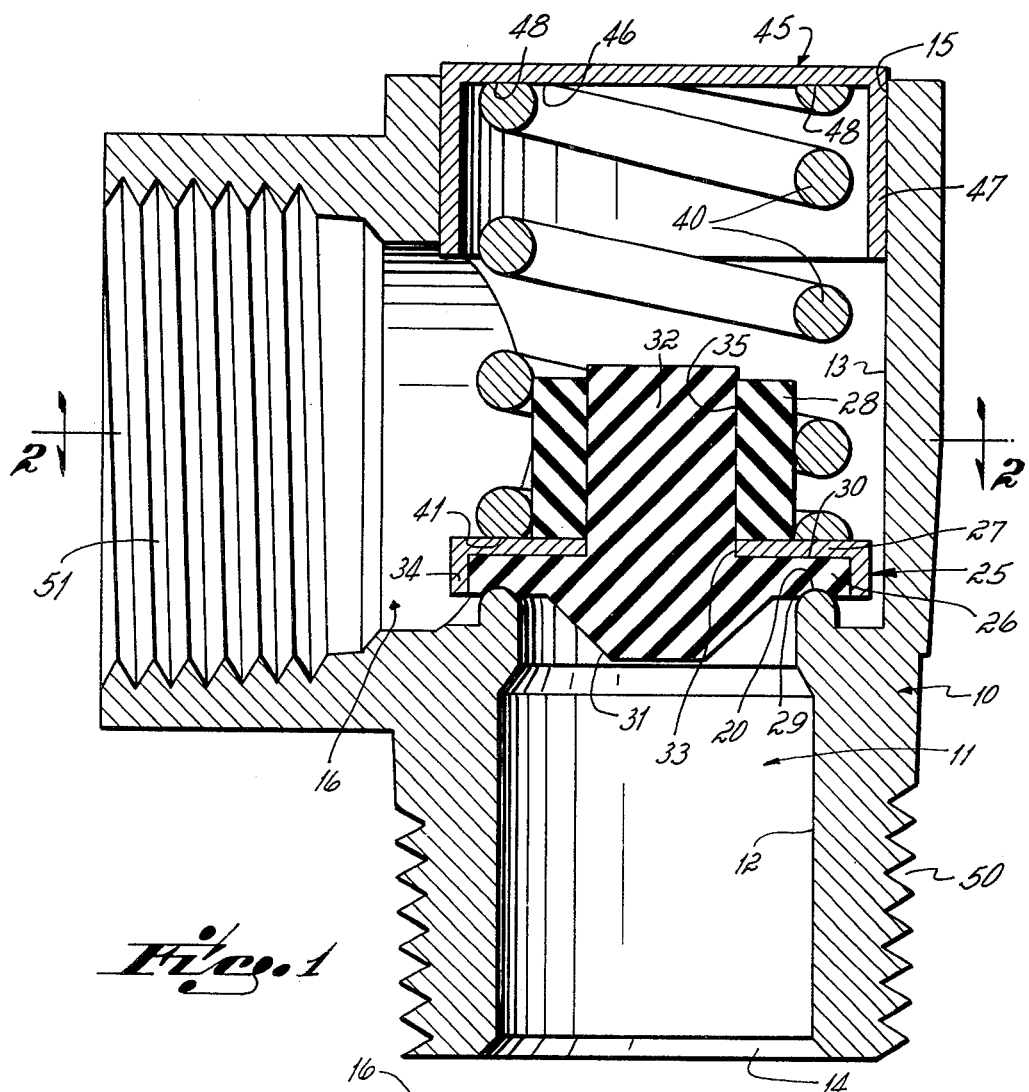

United States Patent [19]

Lowe et al.

[11] 3,911,950

[45] Oct. 14, 1975

[54] PRE-SET PRESSURE RELIEF VALVE

[75] Inventors: Walter D. Lowe; Jacek Pawlowski, both of Toronto, Canada

[73] Assignee: Lunkenheimer, Cincinnati, Ohio

[22] Filed: May 3, 1974

[21] Appl. No.: 466,720

[52] U.S. Cl............................ 137/543.17; 251/358
[51] Int. Cl.²......................................... F16K 15/02
[58] Field of Search ...... 137/535, 539, 540, 543.17, 137/543.19, 543.21, 543.23, 73; 251/367, 334, 358

[56] References Cited
UNITED STATES PATENTS

| 1,274,680 | 8/1918 | Calvert | 137/543.23 |
|---|---|---|---|
| 1,305,964 | 6/1919 | Dickson | 137/539 X |
| 2,521,201 | 9/1950 | Clark et al. | 137/540 X |
| 2,859,031 | 11/1958 | Hansen et al. | 137/73 X |
| 2,902,249 | 9/1959 | Meusy | 251/358 X |
| 2,906,289 | 9/1959 | Fox | 137/535 X |
| 2,908,288 | 10/1959 | Carr et al. | 137/540 |
| 3,086,544 | 4/1963 | Yost | 137/540 X |
| 3,107,417 | 10/1963 | Jaquish, Jr. et al. | 137/539 X |

FOREIGN PATENTS OR APPLICATIONS

| 888,686 | 9/1943 | France | 137/540 |

Primary Examiner—William R. Cline
Attorney, Agent, or Firm—Wood, Herron & Evans

[57] ABSTRACT

A pre-set, tamperproof, pressure relief valve includes a valve body and a bore therethrough, one end of the bore defining a fluid inlet and the other an opening opposite thereto. A transverse relief passage intersects the bore and a seat is located in the bore between the inlet and the relief passage. An improved sealing plug is spring loaded against the seat and the spring is maintained in place by a retainer press fitted in the bore at the opening. The retainer is pressed into the bore a specified distance to compress the spring, and thus final assembly of the valve and the adjustment of the sealing pressure provided by the compressed spring is accomplished in a single manufacturing step.

7 Claims, 2 Drawing Figures

U.S. Patent   Oct. 14, 1975   3,911,950

PRE-SET PRESSURE RELIEF VALVE

This invention relates to pressure relief valves and more particularly to an economically produced pre-set pressure relief valve.

Pressure relief valves of the type upon which this invention is an improvement are typically utilized, for example, in connection with hot water storage heaters. Typical valves are placed in a pressurized water line and are set, via an adjustable mechanism, so they are responsive to a specified maximum pressure in the line. When that pressure is reached, the valve opens in relief thereof.

The adjustable mechanism of such valves normally requires a plurality of various sealing and adjustment parts such as adjusting screws, seals, caps and stems. In addition, many such valves include a locking element for securing the adjustable mechanism once it has been set. Each of these adjustment, sealing and locking elements adds to the manufacturing steps required to produce a valve and substantially increases the cost of the valve. Also, they give rise to additional sealing problems. All of these problems must then be taken into account when considering the claimed advantage of valve adjustability in the field.

It has thus been one objective of the present invention to provide an improved, pre-set pressure relief valve requiring a minimum number of parts and which can be manufactured and assembled very economically.

A further objective of the invention has been to provide an improved, pre-set pressure relief valve which is permanently pre-set and is tamperproof.

A further objective of the invention has been to provide an improved method of manufacturing a pre-set pressure relief valve of simple design wherein final valve assembly and adjustment are accomplished in a single manufacturing step.

A still further objective of the invention has been to provide improved sealing means for a pressure relief valve having an internal circular seat.

A preferred embodiment of the invention includes a valve body having a through bore defining a fluid inlet at one end and an opening opposite thereto at another end, a seat in the bore near the inlet, sealing means cooperating with the seat, a spring urging the sealing means against the seat and a retainer frictionally fit in the opening for compressing the spring against the sealing means to provide a predetermined sealing pressure and for sealing the opening. A transverse fluid relief passageway connects with the through bore and the seat is located between the fluid inlet and the transverse relief passageway to normally close off the passageway from the fluid inlet.

The retainer is set a predetermined distance into the bore through the opening, and the spring thus holds the sealing means against the seat until a pressure sufficient to displace the spring is present at the fluid inlet. The sealing means then unseats to relieve the pressure in the line to which the valve is attached.

The preferred sealing means includes an assembly of a disc having a forward sealing face with a conical projection thereon and a rearward face having a rearwardly extending cylindrical projection, a washer supporting the disc and mounted against the rearward face about the cylindrical projection and a tube over the projection to hold the washer in place and to serve as a spring guide. The conical projection has a base diameter, larger than the cylindrical projection receiving hole in the washer, in order to reinforce the disc against blow-out. Also, the conical projection serves to symmetrically deflect escaping fluid thereby tending to maintain disc and seat alignment, and it acts as a guide to direct the seal upon closing in the event it has become displaced.

In manufacturing the valve, the valve body is first cast, and then bored, threaded or otherwise treated, the seat being formed therein as described. The sealing means described above and a coil spring are then assembled and inserted into the bore through the opening so that the sealing means engages the seat. Thereafter, a cup-shaped retainer is pressed into the opening, against the bias of the spring, and is held in the bore by a friction or interference fit. The distance the retainer is inserted controls the spring compression and thus the pressure at which the valve will respond to fluid inlet pressure. The friction fit of the retainer also serves to seal the opening in the valve body.

In this manner, an extremely economical pre-set pressure relief valve is provided wherein the valve has a minimum number of parts, yet provides an efficient seal and can be made with a minimum number of manufacturing steps. Final assembly and adjustment are accomplished in a single manufacturing step and many parts normally utilized in an adjustable valve are all eliminated. While efficient, the valve is made so economically that if it malfunctions for some reason, or needs repair, it can simply be thrown away in favor of a replacement.

Figure 2:
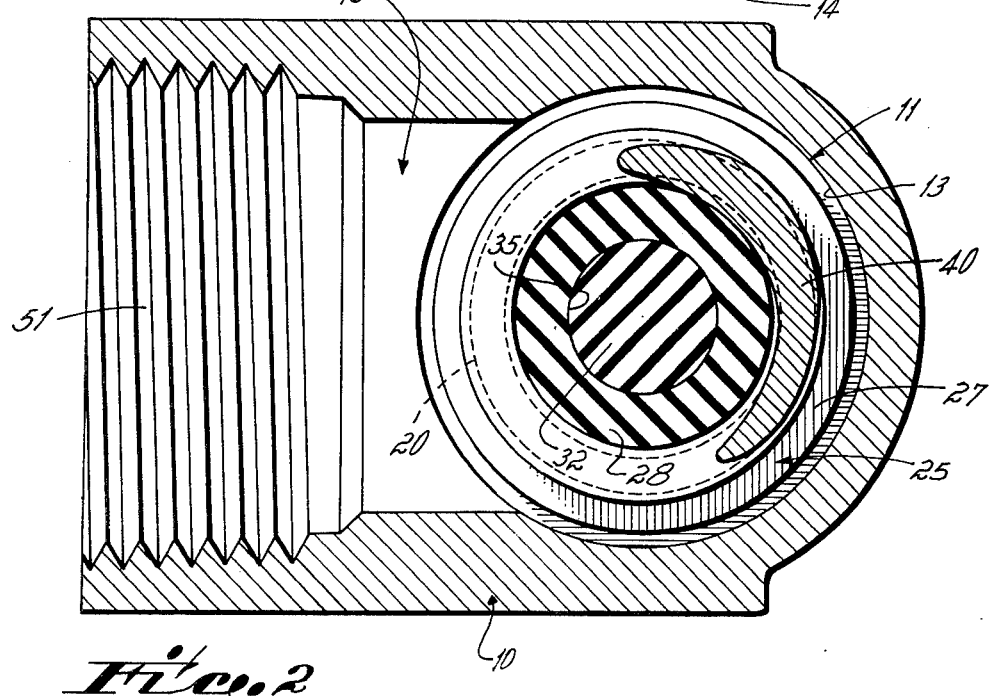

These and other objectives and advantages will become readily apparent from the following detailed description and drawings in which:

FIG. 1 is a cross-sectional view of an assembled valve according to the invention; and FIG. 2 is a cross-sectional view taken along the lines 2—2 of FIG. 1.

Referring now particularly to the drawings, FIG. 1 is a cross-sectional view of a preferred embodiment of a pre-set pressure relief valve according to the invention. In FIG. 1 a valve body 10 has a through bore 11. For descriptive purposes, the bore 11 is divided into a forward portion 12 of one diameter, and a rearward portion 13 of a second and larger diameter. At a forward end, the through bore 11 defines a fluid inlet 14. At a rearward end, the through bore 11 defines an opening 15 which may be considered as being opposite to the fluid inlet 14. In addition, the valve body 10 includes a transverse relief passage or bore 16 which intersects with the through bore 11 in the area of the rearward portion 13. In use, the fluid inlet 14 is connected to a water line, for example, and the relief passage 16 is connected to a vent or drain.

An annular or circular seat 20 is formed integrally with the body 10 between the portions 12 and 13 of the through bore 11 and more specifically, is located between the fluid inlet 14 and the intersection of the transverse bore or passageway 16 with the through bore 11. A sealing means or plug 25 is disposed in cooperational relationship with the seat 20 for normally closing the bore 11.

The sealing means 25 generally includes a sealing disc 26, a support washer 27 and a tube member 28. The sealing disc 26 has a forward sealing face 29 and a rearward face 30 and is of a diameter greater than that of the seat 20 so that the disc is operable to engage the seat 20 and thereby close the through bore 11. The disc 26 is provided with a forwardly extending conical projection 31 and a rearwardly extending cylindrical projection 32, each of which are formed integrally with the disc 26. Preferably, the disc and its projections are made from a rubber like material, such as BUNA-N having a durometer characteristic of about 70.

The support washer 27 is mounted over the cylindrical projection 32 via a hole or bore 33 in the washer, and the washer includes a forwardly extending annular skirt 34. The washer 27 is of a diameter slightly greater than that of the disc 26 so that the forwardly extending skirt 34 surrounds the periphery of the disc as shown in FIG. 1.

The tube member 28 is made from the same material as the disc and has an internal bore 35 which is approximately equal to the diameter of the cylindrical projection 32. The tube 28 thus may be slipped over the cylindrical projection 32 and is frictionally held thereon so that it serves to hold the washer 27 in place as shown.

In order to force the sealing means 25 against the seat 20, a coil spring 40 enages the sealing means at one end thereof and extends rearwardly toward the opening 15. More specifically, the coil spring 40 has an internal diameter approximately equal to the external diameter of the tube 28 and thus the tube 28 and the cylindrical projection 32 serve as a spring guide for the coil spring 40. As shown in FIG. 1, the coil spring is formed to have a general diameter approximately equal to the diameter of the annular seat 20 and the forward end of the coil spring, at the point where it engages the supporting washer, is ground flat as at 41 so that it uniformly engages the washer about the tube 28. In this manner, the disc 26 can be compressed evenly and uniformly about the seat 20 with the spring pressure bearing on the disc directly in line with the seat.

The rear end of the spring is held in place by a cup-shaped retainer 45 which includes a flat bottom portion 46 and a forwardly extending annular skirt 47. The outer circumference of the annular skirt 47 and the inner circumference of the opening 15 are both perfectly round and the diameter of the outer surface of the skirt is substantially equal to that of the opening 15 so that the container can be fitted within the bore 11 at the opening 15 and held therein by virtue of a very secure friction or press fit. As at the forward end of the coil spring 40, flats 48 are provided on the last coils of the spring 40 so that the spring bears uniformly on the bottom surface 46 of the retainer.

Manufacture and assembly of the valve is relatively simple. The last manufacturing step finally assembles the parts and at the same time pre-sets the sealing pressure. The valve body 10 is cast out of a suitable material, such as bronze, and thereafter threaded (as at 50 and 51) and otherwise shaped or treated to finish the internal surfaces of the bore's passageways and the seat 20. The sealing means 25 is then assembled by slipping the washer 27 over the cylindrical projection 32 and thereafter fitting the tube 28 over the projection to hold the washer against the disc 26 in the position shown in the drawing. The sealing means 25 is then inserted, together with the coil spring 40, into the bore 11 through the opening 15. The retainer 45 is thereafter pressed into the opening 15 so that its skirt portion 47 frictionally engages the internal surface of the bore in a very tight relationship.

The retainer 45 is pressed into the bore 11 against the bias of the coil spring 40 and it can be appreciated that the distance through which the retainer 45 is moved into the bore determines the compressive force applied to the spring 40, and correspondingly the sealing pressure applied by the sealing means 25 against the seat 20. By varying the distance through which the retainer 45 is inserted into the body, the pressure of the fluid at the fluid inlet 14, to which the sealing means 25 responds, can be accordingly adjusted. When that pressure is reached, the bias of the coil spring 40 is overcome and the sealing means 25 is moved rearwardly toward the retainer, which is still immovably retained in the bore 11, to open the bore 11 and permit fluid to flow into the transverse relief bore or passageway 16. Due to the very tight fit of the retainer 45 within the opening 15, the retainer serves to seal the opening against fluid leakage therethrough. The valve is now ready for use and can be connected into the appropriate fluid lines by the threaded portions 50 and 51.

The conical projection 31 serves several functions. When the sealing means is moved rearwardly, by fluid pressure at the inlet 14, fluid in the forward portion 12 of the bore 11 flows rearwardly against the conical projection and is thereby diverted in a generally concentric or symmetrical manner about the disc. This tends to maintain the sealing means 25 in an aligned condition. Should, however, the sealing means 25 become misaligned with respect to the seat 20, the tapered sides of the conical projection 31 serve to guide the sealing means 25 back toward proper sealing position when the pressure at the fluid inlet 14 is reduced.

Additionally, as seen in FIG. 1, the diameter of the base of the conical projection is larger than the diameter of the hole 33 in the washer 27. This construction provides an increased cross-section or thickness of material of the disc in the area of the hole 33 and thus serves to inhibit blow-out or deformation of the disc and conical projection through or with respect to the hole 33.

The preferred embodiment of the invention thus described provides a very simple pre-set pressure relief valve which is not subject to tampering. The valve can be very easily and economically manufactured and can be produced on a mass basis. Its cost is very low so that if for any reason it should malfunction, it can merely be removed and replaced by a comparable valve. Thus, repair of the valve is not a consideration.

The very simple construction provided by the invention eliminates the normal elements of adjustable pressure relief valves such as the adjusting screw, seals, caps, stems and other locking mechanisms in favor of a single extruded cap which is made to provide a heavy interference fit in the valve body. Adjustment of the valve and final assembly are one and the same. The retainer is simply pressed into the body on a special jig until the proper set pressure is reached and the valve is thereafter ready for use.

These and other modifications will become readily apparent to those of ordinary skill in the art without departing from the scope of the invention and applicants intend to be bound only by the following claims.

We claim:

1. An improved sealing plug for cooperating with a circular seat comprising:

a sealing disc having a flat circular forward sealing face for engaging and sealing against said seat, a rearward face, a forwardly extending conical projection on said forward face, a rearwardly extending cylindrical projection on said rearward face, a support washer disposed against said rearward face, said cylindrical projection extending through a hole in said washer, said washer having a diameter greater than that of said disc, an annular skirt on said washer extending forwardly thereof at right angles thereto and surrounding the periphery of said disc, a resilient tube frictionally fitted over said cylindrical projection and engaging said washer thereby holding it against said disc, and said conical projection having a base of a diameter greater than that of the hole in the washer so as to strengthen the disc against movement through said hole, and lesser than that of the circular forward face.

2. A pre-set, non-adjustable pressure relief valve comprising:

a body having a through bore with first and second open opposite ends and a transverse bore intersecting and connecting with said through bore intermediate said ends, said bore adjacent said second end having smooth uninterrupted internal walls, an annular seat between said first end and said intersection, said annular seat surrounding a portion of said through bore, sealing means cooperating with said seat to close said through bore, said sealing means including, a resilient sealing disc having a flat circular forward sealing face engaging said seat and a projection extending from a rear side of said disc rearwardly toward said second end, the diameter of said disc being at least as great as that of said seat, a washer having a diameter at least equal to that of said circular seat and disposed against the rear side of said disc in supporting relationship, said washer having a depending annular flange surrounding a periphery of said disc, a hole in said washer, said projection extending therethrough, and resilient tube means surrounding said projection and engaging and holding said washer against said disc, said valve further including, a retainer frictionally secured in said through bore and closing said through bore at said second end, said retainer being cup-shaped and including a flat bottom and an annular skirt surrounding said bottom and having external walls adapted for a frictional fit within said through bore, spring means between the flat bottom of said retainer and said sealing means for biasing said sealing means toward said first end and for holding said sealing means against said seat, said retainer being pressed into said through bore at said second end without restriction, except for said friction fit and the bias of said spring means, such that a predetermined sealing pressure between said seat and said sealing means is provided by the selected assembly position of the retainer with respect to said seat within said through bore.

3. A valve as in claim 2 wherein said spring is a coil spring and engages said washer, said tube and said cylindrical projection fitting within said coil spring and serving as a guide therefor.

4. A valve as in claim 3 wherein said spring is compressed to a predetermined compression when said retainer is fitted into said opening so that said passageway remains closed up to a predetermined fluid pressure at said inlet.

5. A valve as in claim 2 wherein said spring means is a coil spring engaging said retainer at one end and said washer at another end, in order to urge said disc against said seal.

6. A valve as in claim 5 wherein said spring has a diameter approximately equal to that of said annular seat, and wherein said projection and said tube means extend rearwardly within said coil spring.

7. A valve as in claim 2 including a conical projection on the forward face of said disc, said conical projection having a base diameter greater than that of the hole in said washer.

* * * * *